United States Patent [19]

Al-Saidi

[11] 4,182,617
[45] Jan. 8, 1980

[54] APPARATUS FOR THE WET SEPARATION OF FOREIGN PARTICLES FROM AIR

[76] Inventor: Mohamed A. Al-Saidi, c/o Embassy of the Yemen Arab Republic, 600 New Hampshire, NW., Washington, D.C. 20037

[21] Appl. No.: 924,828

[22] Filed: Jul. 14, 1978

[30] Foreign Application Priority Data

Mar. 15, 1978 [DD] German Democratic Rep. ... 204188

[51] Int. Cl.² .............................................. B01D 47/02
[52] U.S. Cl. ........................................ 55/256; 55/431; 55/466; 261/124
[58] Field of Search ................. 55/227, 228, 255, 256, 55/431, 466; 261/77, 121 R, 124

[56] References Cited

U.S. PATENT DOCUMENTS

| 396,507 | 1/1889 | Pearson | 261/124 |
|---|---|---|---|
| 404,621 | 6/1889 | Hibbert | 55/255 |
| 521,054 | 6/1894 | Shank | 261/124 |
| 1,051,956 | 2/1913 | Jacobs et al. | 261/124 |
| 1,575,292 | 3/1926 | Tyler | 55/227 |
| 2,000,443 | 5/1935 | Hechenbleikner | 261/121 R |
| 3,520,113 | 7/1970 | Stokes | 55/256 |

FOREIGN PATENT DOCUMENTS

| 75430 | 9/1915 | Austria | 261/121 |
|---|---|---|---|
| 380737 | 12/1907 | France | 55/256 |
| 17249 | 10/1970 | Japan | 55/255 |

*Primary Examiner*—David L. Lacey
*Attorney, Agent, or Firm*—Wenderoth, Lind & Ponack

[57] ABSTRACT

An apparatus for the wet separation of foreign particles from contaminated air includes a closed vessel containing a predetermined level of liquid. A supply duct supplies contaminated air containing foreign particles into the vessel at a position above the predetermined level of liquid. A plurality of air pipes have upper ends directly connected to the supply duct and have lower ends that terminate in the liquid at positions below the predetermined level, such that the air pipes directly supply contaminated air from the supply duct into the liquid. The liquid removes the foreign particles from the air to form purified air. An air outlet discharges the purified air from the vessel at a position above the predetermined level of liquid. The bottom of the vessel is trough-shaped and inclines downwardly to a liquid outlet from which liquid having entrained therein foreign particles is removed from the vessel. At least one of the air pipes is positioned to terminate adjacent the liquid outlet and to emit air which agitates any foreign particles tending to settle on the bottom of the vessel adjacent the liquid outlet.

7 Claims, 6 Drawing Figures

APPARATUS FOR THE WET SEPARATION OF FOREIGN PARTICLES FROM AIR

FIELD OF THE INVENTION

The present invention relates to an apparatus for the wet separation of foreign particles from contaminated air.

More particularly, the present invention relates to such an apparatus which may be employed as an air separator on the inlet side of an air-conditioning system.

The present invention is even futher particularly directed to such an apparatus which may be employed to purify or decontaminate air in geographical regions in which sandstorms occur.

SUMMARY OF THE INVENTION

In accordance with the present invention, there is provided an apparatus for the wet separation of foreign particles from contaminated air, the apparatus including a closed vessel containing therein a predetermined level of liquid. A supply duct supplies contaminated air containing foreign particles into the vessel at a position above the predetermined level of liquid. A plurality of air injection devices supply the contaminated air directly from the supply duct into the liquid at positions below the predetermined level, such that the liquid removes the foreign particles from the air to form purified air. The air passes upwardly through the liquid during which time the air is purified, and then the purified air is discharged from the vessel through an air outlet located at a position above the predetermined level. A liquid outlet is located adjacent the bottom of the vessel for removing from the vessel liquid having entrained therein foreign particles previously removed from the air. At least one of the air injection devices is positioned adjacent the liquid outlet to emit air closely adjacent to the bottom of the vessel to agitate any foreign particles tending to settle on the bottom of the vessel adjacent the liquid outlet. A liquid supply provides a supply of fresh liquid into the vessel to replace liquid removed through the liquid outlet.

The bottom of the vessel is preferably inclined downwardly toward the liquid outlet, and further preferably the bottom of the vessel is trough-shaped. By this construction, foreign particles removed from the contaminated air will tend to be accumulated in the lowermost portion of the vessel, i.e. adjacent the liquid outlet. The provision of at least one air injection device adjacent the liquid outlet prevents accumulation of the removed foreign particles to an extent such as would otherwise block the liquid outlet.

The arrangement of the supply duct at a level above the predetermined liquid level ensures that the liquid cannot penetrate into or back up into the supply duct in the event of an interruption in the supply of the contaminated air.

Preferably the air injection devices are a plurality of air pipes having first ends attached to the supply duct and second ends terminating at positions within the liquid below the predetermined level thereof. By this structural arrangement, the initial air stream of contaminated air is divided into a plurality of small partial air streams. This improves the retention of the foreign particles by the liquid.

Preferably, the supply duct extends substantially horizontally throughout substantially the entire length of the vessel, and the air pipes are arranged in planes which extend substantially transverse to the axis of the supply duct.

The supply duct and the air pipes may have any convenient cross-section, for example a circular cross-section. It is however possible that the supply duct and air pipes may be provided with other cross-sectional configurations, for example rectangular cross-sectional configurations.

The free ends of the air pipes may all terminate within the liquid at substantially the same level therein. Alternatively, the free ends of the air pipes may terminate within the liquid at different depths which vary with the inclination of the bottom of the vessel. In this event, it may be advantageous to provide that, as the air pipes extend into the liquid at greater depths, the cross-sectional area of the air pipes may slightly increase. In all embodiments of the invention however, at least one air pipe is intended to extend downwardly to a position closely adjacent the bottom of the vessel near the liquid outlet to agitate removed foreign particles thereat. The air pipes may be arranged in rows extending longitudinally of the trough-shaped vessel.

There further may be provided an overflow pipe having a first end connected to the liquid outlet and a second end positioned at the predetermined level. Thus, liquid will flow out of the vessel through the overflow pipe whenever the level of the liquid within the vessel exceeds the predetermined level.

A pressure source, such as a blower or fan may be connected to the supply duct to ensure that the contaminated air is supplied into the supply duct at a pressure sufficient such that the contaminated air is injected through the air pipes and into the liquid.

The contaminated air may be supplied into the liquid merely through open ends of the air pipes, or alternatively injection nozzles could be positioned in the open ends of the air pipes.

The liquid supply may include a mechanism for automatically adjusting the flow of fresh liquid into the vessel.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
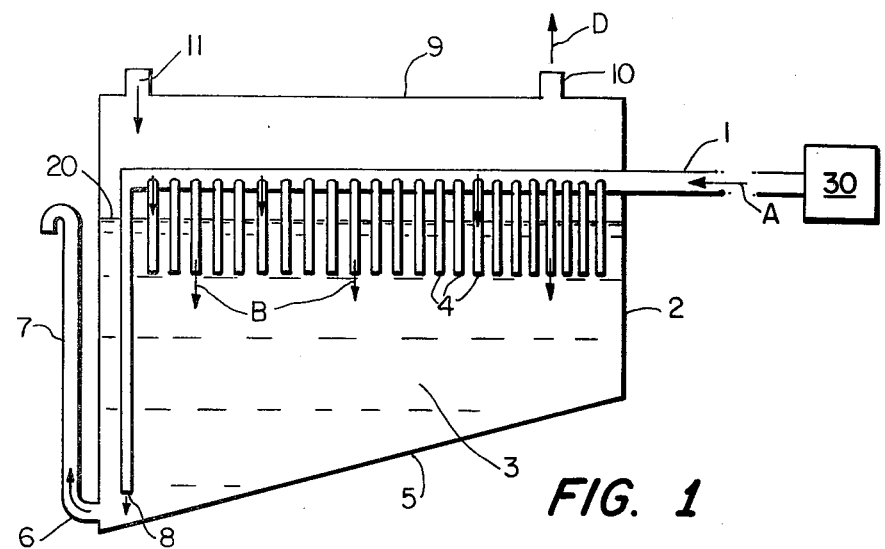
FIG. 1 is a schematic side sectional view of one embodiment of the present invention.

With reference now to the drawings, the apparatus for the wet separation of foreign particles from contaminated air in accordance with the present invention includes an enclosed vessel 2 containing therein a suitable liquid 3 up to a predetermined level 20. The liquid 3 may be any suitable liquid which will operate in the manner described herein to retain foreign particles, such as sand, and which will not otherwise contaminate the air. One example of a liquid which may be employed is water, however those skilled in the art will readily understand other liquids which may be employed.

A supply duct 1 extends into the interior of vessel 2 and extends substantially horizontally therein at a level above predetermined level 20. A plurality of air pipes 4 have upper ends connected to supply duct 1 and have lower ends terminating in liquid 3 at positions below predetermined level 20. Thus, contaminated air is supplied through supply duct 1, as indicated by arrow A, and then passes into air pipes 4, which then discharge the contaminated air into the liquid 3, as indicated by arrows B. The air then passes upwardly through the liquid 3, as indicated at arrow C in FIG. 3, whereby the liquid removes foreign particles suspended in the air, thus forming purified air. The purified air is then removed from the vessel 2 via air outlet 10 at a position above predetermined level 20, as indicated by arrow D. The thus purified air may then be supplied to a consumer or position of utilization.

Figure 2:
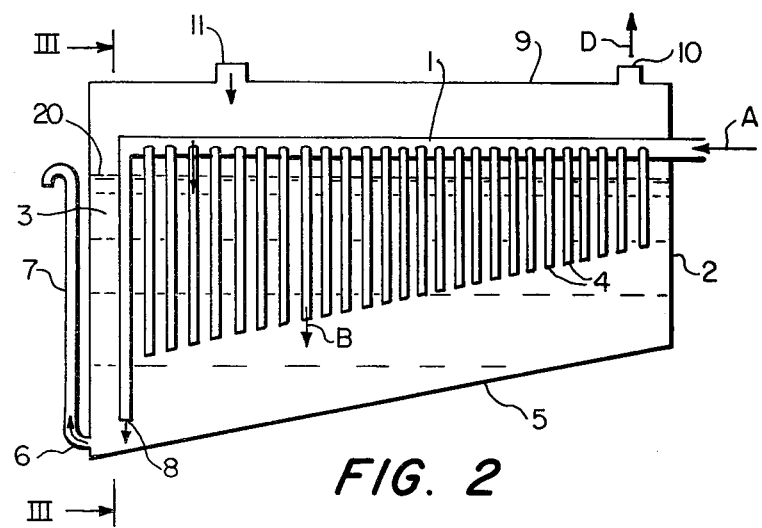
FIG. 2 is a schematic side sectional view of a second embodiment of the present invention.
Figures 3, 4, 5, 6:
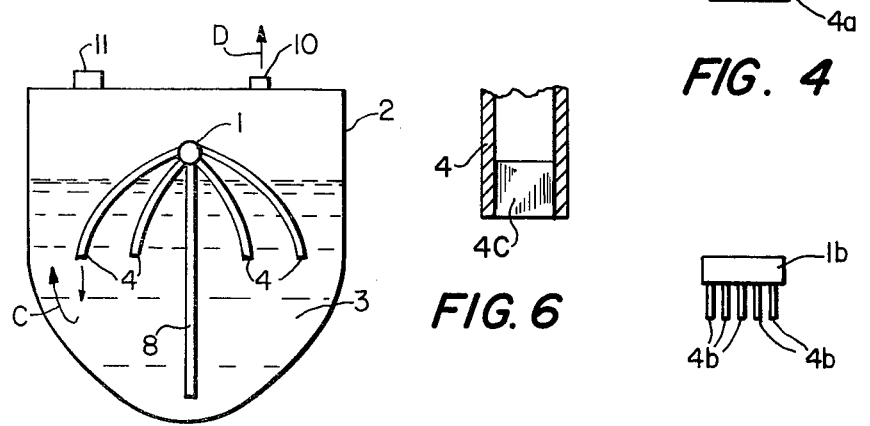
FIG. 3 is a schematic transverse section taken along line III—III of FIG. 2.
FIGS. 4 and 5 are partial schematic transverse sections showing modified configurations of the supply duct and air pipes.
FIG. 6 is an enlarged section showing a detail of the injection end of one of the air pipes.

The bottom 5 of the vessel 2 is preferably inclined, as shown in FIGS. 1 and 2, and further is preferably trough-shaped, as shown in FIG. 3. Thereby, foreign particles removed from the contaminated air will tend to be accumulated at the lower central position of the bottom 5, i.e. on the left side of the bottom of the vessel as viewed in FIGS. 1 and 2. A liquid outlet 6 is provided adjacent the bottom 5 of the vessel 2. An overflow pipe 7 is connected to liquid outlet 6, and overflow pipe 7 has an upper end which extends up to the predetermined level 20. Thus, whenever the level of liquid within vessel 2 is higher than predetermined level 20, liquid having entrained therein foreign particles removed from the contaminated air will be discharged out of vessel 2 via liquid outlet 6 and overflow pipe 7.

A liquid supply 11 may be provided for supplying fresh liquid into the vessel to replace liquid removed through the liquid outlet 6 and overflow pipe 7. The liquid supply 11 may have incorporated therewith a mechanism for automatically adjusting the flow of fresh liquid into the vessel.

Air pipes 4 may all extend to an equal depth into liquid 3, as shown in FIG. 1 of the drawings. Alternatively, as shown in FIG. 2 of the drawings, air pipes 4 may extend into the liquid 3 at different depths varying substantially with the inclination of the bottom 5 of the vessel.

As shown in FIG. 3 of the drawings, the air pipes are preferably arranged in plural rows extending longitudinally of the trough-shaped vessel. Furthermore, as shown in FIG. 3 of the drawings, the supply duct 1 and air pipes 4 have substantially circular configurations. However, other configurations of the supply duct and air pipes are intended to be within the scope of the present invention. Specifically, as shown in FIG. 4, the supply duct 1a may have a rectangular transverse cross-sectional configuration, and a single elongated air pipe 4a, rather than a plurality of air pipes, may extend transversely to supply duct 1a. Also, as shown in FIG. 5, the supply duct 1b may have a rectangular transverse cross-sectional configuration, with a plurality of rows of air pipes 4b, also of a rectangular configuration, extending therefrom.

In all embodiments of the present invention however, at least one air pipe 8 has an increased length and is immersed to a greater depth within the liquid. Specifically, air pipe 8 terminates adjacent the bottom 5 at a location near the liquid outlet 6. Thus, air pipe 8 emits air which tends to create turbulence or tends to agitate the area adjacent liquid outlet 6, thereby preventing the accumulation of settled foreign particles, for example sand, and thereby preventing clogging or blockage of liquid outlet 6.

In the event that the air pipes are successively immersed by greater depths into the liquid, then it may be desirable to increase the cross-sectional dimensions of the air pipes as the immersion depths thereof increase.

The air may be injected into the liquid merely through open ends of the air pipes, or alternatively injection nozzles 4c could be provided in the free lower ends of the air pipes, as shown in FIG. 6.

It is intended to be within the scope of the present invention that the device thereof be associated with a fan or blower (shown schematically at 30 in FIG. 1) to ensure that the pressure difference between the air supply duct and the air outlet is sufficient to ensure the supply of the contaminated air through all of the air pipes.

It is intended to be within the scope of the present invention that the various structural elements thereof may be fabricated from suitable materials such as metal, plastics material, glass, and/or glass fiber reinforced plastic materials.

It is believed that the operation of the present invention will be apparent from the above description. It is believed to be further apparent that the apparatus of the present invention may be associated with various other known mechanisms, such as air-conditioning systems, to treat air which is contaminated with suspended foreign particles to purify the air. For example, the apparatus of the present invention may be employed to ventilate buildings when the exterior air is contaminated by sand during a sandstorm. The apparatus of the present invention is effective to purify such air in a very short amount of time, even when the air has a relatively high proportion of foreign particles therein.

Although the present invention has been described and illustrated with regard to preferred embodiments thereof, it is to be understood that various modifications may be made to the specifically described and illustrated structural arrangements without departing from the scope of the present invention.

What I claim is:

1. An apparatus for the wet separation of sand from contaminated air having suspended therein sand particles, said apparatus comprising:

a closed elongated vessel having opposite first and second ends and a longitudinal dimension extending substantially horizontally between said ends, said vessel containing therein a predetermined level of liquid;

air supply means for supplying contaminated air having suspended therein sand particles into said vessel, said air supply means comprising an elongated supply duct extending into said vessel through one of said ends thereof and extending through the interior of said vessel, in a direction parallel to said longitudinal dimension of said vessel, and at a position above said predetermined level;

air injection means for supplying said contaminated air from said supply duct into said liquid at plural positions below said predetermined level, whereby said liquid removes said sand particles from said air to form purified air which rises through said liquid, and the thus removed sand particles fall to the bottom of said vessel, said air injection means comprising a plurality of air pipes having first ends connected to said supply duct and second ends terminating at said positions below said predetermined level, said second ends of said air pipes opening and being directed vertically downwardly, said second ends of said air pipes being arranged and positioned uniformly throughout the horizontal cross-section of said vessel;

air outlet means for discharging said purified air from said vessel at a position above said predetermined level;

said bottom of said vessel being trough-shaped and having a sufficient downward inclination in said longitudinal direction from said first end to said second end of said vessel such that said sand particles slide downwardly along said bottom toward the bottom center of said second end of said vessel;

liquid outlet means, located at said bottom center of said second end of said vessel, for removing from said vessel liquid having entrained therein said sand particles;

at least one of said air pipes extending downwardly into said liquid further than the remainder of said air pipes, said second end of said at least one air pipe being positioned closely adjacent said liquid outlet means, such that air emitted from said second end of said at least one air pipe agitates said sand particles sufficiently to prevent said sand particles from clogging said liquid outlet means;

an overflow pipe having a first end connected to said liquid outlet means and a second end positioned at said predetermined level, such that liquid and sand particles entrained therein will flow out of said vessel through said liquid outlet means and said overflow pipe whenever the level of said liquid within said vessel exceeds said predetermined level; and liquid supply means for supplying fresh liquid into said vessel, and whereby liquid having sand particles entrained therein is removed from said vessel through said liquid outlet means and said overflow pipe.

2. An apparatus as claimed in claim 1, wherein said supply duct means extends substantially horizontally, and said air pipes extend in planes extending substantially transverse to the axis of said supply duct means.

3. An apparatus as claimed in claim 1, wherein said second ends of said air pipes terminate within said liquid at different depths varying with the inclination of said bottom of said vessel.

4. An apparatus as claimed in claim 1, wherein said air pipes are arranged in rows extending longitudinally of said trough-shaped vessel.

5. An apparatus as claimed in claim 1, further comprising pressure supply means for forcing said contaminated air through said supply duct means with sufficient pressure such that said contaminated air is injected through said air injection means.

6. An apparatus as claimed in claim 1, wherein said liquid supply means is connected to the interior of said vessel at a position above said predetermined level.

7. An apparatus as claimed in claim 1, wherein said second ends of said air pipes include injection nozzles for injecting said contaminated air into said liquid.

* * * * *